United States Patent Office 3,499,780
Patented Mar. 10, 1970

3,499,780
METHOD OF MAKING A COATED
ALUMINUM REFLECTOR
Theodore L. Etherington and Herbert L. Curry, Hendersonville, N.C., assignors to General Electric Company, a corporation of New York
No Drawing. Filed Dec. 6, 1966, Ser. No. 599,390
Int. Cl. G02b 5/08; B44d 1/34
U.S. Cl. 117—35                    11 Claims The present invention relates to aluminum reflectors having a specular reflecting surface, and more particularly relates to such reflectors having a protective coating thereon and to a method of making the same.

It is an object of the invention to provide aluminum reflectors with a highly specular reflective surface and a protective coating therefor which does not substantially reduce its reflectivity.

It is another object of the invention to provide a process of making aluminum reflectors of the above type.

It is a particular object of the invention to provide a process of the above type which dispenses with an anodizing step for protecting the aluminum surface.

Other objects and advantages will become apparent from the following description and the appended claims.

With the above objects in view, the present invention, in one of its aspects, relates to a method of making an aluminum reflector which comprises treating an aluminum article for providing a highly reflecting surface thereon, applying a silicate solution on the thus treated surface, and heating the thus applied silicate solution to produce a hard, tightly adherent, transparent silicate coating on the specular reflecting aluminum surface.

A particularly preferred embodiment of the invention is as follows. First, the surface of the aluminum article is mechanically buffed to remove scratches and other marks on the surface of the aluminum. Such buffing may b done by using any suitable abrasive paste, such as jewelers rouge, applied by a cloth-covered buffing wheel.

After the buffing step and a washing treatment to remove the abrasive material, the surface is subjected to a brightening treatment, preferably using a chemical brightening solution to provide thereon a highly specular reflecting surface. Such a chemical treatment is disclosed, for example, in the patent to Cohn 2,729,551, and the disclosure of such treatment in the patent is incorporated herein by reference. A particular chemical treatment found satisfactory for the purposes of the present invention comprises dipping the aluminum article in a hot solution, e.g., at 220° F., containing free phosphoric acid and nitric acid. A particular solution of this type comprises, in percent by weight:

|                  | Percent |
|------------------|---------|
| Phosphoric acid  | 81      |
| Nitric acid      | 3       |
| Water            | 16      |

After the article is kept in the bath for about 4 minutes, it is removed and rinsed in cold water, which preferably contains a small amount of potassium hydroxide or sodium hydroxide to provide a pH of about 9. This speeds up the washing process for removing the acid solution. The described brightening treatment removes any oxide film on the aluminum surface, and smoothes out the surface, and as a result the aluminum article is provided with a highly specular reflective surface usually characterized before addition of the protective coating by a total reflectance of as much as 90% or more of which the diffuse component is 10% or less. By total reflectance is meant the amount of light reflected from a surface as compared to the amount of light incident on the surface. By "diffuse" light is meant scattered light reflected by the surface as a result of irregularities therein. Spectrophotometers may be employed to measure the amounts of total reflectance and diffuse reflectance.

Shortly after the brightening step, and preferably immediately thereafter, the aluminum article is coated with a protective silicate film which is typically about 0.2 mil thick. For this purpose, the aluminum member is dipped in a solution comprising an alkali metal silicate and water, and preferably also containing a wetting agent. The metal silicate compound may, for example, be potassium silicate or sodium silicate. The water solution contains, in percent by weight, about 5–25% solids in the form of alkali metal oxide and silica, with a typical composition containing about 15% solids and 85% water. A particularly satisfactory commercially available potassium silicate solution used in preparing the silicate coating bath has the following approximate composition in percent by weight:

|                           | Percent |
|---------------------------|---------|
| Potassium oxide, $K_2O$   | 8.3     |
| Silica, $SiO_2$           | 20.8    |
| Water                     | 70.9    |

To make the silicate coating bath, the following solution is provided, using the above commercial potassium silicate solution:

|                              | Percent |
|------------------------------|---------|
| Potassium silcate solution   | 50      |
| Water                        | 50      |
| Wetting agent                | 0.1–0.3 |

The presence of the wetting agent enables the silicate coating solution to thoroughly wet the surface of the aluminum member so as to produce a continuous, tightly adherent, uniform silicate film thereon, and also to facilitate removal of the excess silicate solution from the article when the latter is removed from the bath. However, use of a wetting agent is not always necessary.

Examples of suitable wetting agents which may be used are diamyl sodium sulfosuccinate (Aerosol AY), modified sodium lauryl sulfate (Wetanol), and sodium lignin sulfonate (Marasperse C). In general, any surface active agent which is compatible with the alkali metal silicate used for the coating bath may be employed. A particular wetting agent which has been found suitable is Triton X200, which comprises as the principal active ingredient 28% of an anionic sodium alkyl aryl polyether sulfonate.

After the aluminum member is taken from the coating bath and following the removal of excess silicate solution therefrom, as by permitting it to drain while stationary or by spinning it, the thus coated member is dried, either in air at room temperature or in an oven at temperatures up to 200° F.

Thereafter the coated article is baked for about 6 minutes at about 600–700° F. to dehydrate and thereby harden the coating. Then the baked coated article is removed from the baking oven and thereafter dipped for about 30 seconds in a hot acid solution, e.g., a 20% nitric acid solution at a temperature about 140° F., for neutralizing the chemically bound water or hydrates remaining in the surface regions of the silicate coating. Such neutralization avoids the formation of carbonates by contact of such hydrates with the $CO_2$ in the air, which would otherwise cause a hazy film to form on the silicate coating due to efflorescence. Then, the article is rinsed a short time in warm water containing a small amount of potassium hydroxide or sodium hydroxide to wash of the acid remaining on the surface.

Usually, this process is repeated to apply two coats of the silicate film, giving it total coating thickness of about 0.2 mil.

The brightening step described above removes substantially all of any aluminum oxide film which may be present on the surface. It is preferable, as indicated above, to apply the protective silicate coating to the thus brightened surface immediately or as soon as possible after the brightening step in order to minimize the formation of an aluminum oxide film, which tends to form by mere exposure to the ambient air. Such films are to be avoided so far as possible in order (1) to provide for an intimate chemical bond between the base aluminum metal and the silicate compound of the coating material so as to produce a much more adherent protective coating than would be obtainable in the presence of such oxide films, and (2) to retain the maximum specularity of the chemically brightened surface.

In connection with the above described baking step of about 600° F.–700° F., it has been found that temperatures below about 600° F. do not result in sufficient stability of the silicate coating. Baking temperatures at least about 600° F. are necessary to ensure maximum feasible dehydration of the silicate film and thereby provide a transparent film. Baking the coating above about 700° F. to about 900° F. does not materially reduce the remaining small amount of hydrates in the silicate coating, and it is preferred not to heat the coated aluminum above about 900° F. to avoid the risk of adversely affectiing the properties of the aluminum.

It will be understood that the process as described above is given only by way of example and that the invention is not intended to be limited by the specific details thereof. For example, the treatment of aluminum to produce a specular reflective surface thereon prior to applying the silicate coating may be other than by the described chemical treatment, such as by a suitable mechanical smoothing and polishing process, or by a chemical treatment other than that described. Also, the application of the silicate coating solution may be by methods other than dipping as described, such as by spraying, brushing, rolling, electrophoretic deposition, or by other suitable techniques.

The silicate coating produced in accordance with the invention is a hard, glassy, tightly adherent transparent film which is highly resistant to attack by chemicals and other contaminating agents, is very easy to clean, and does not markedly affect the highly reflecting characteristics of the aluminum surface which it overlies.

It was further found unexpectedly that highly reflective specular surfaces on aluminum of less purity can be achieved by use of the described process, as compared to known processes wherein the chemical brightening step is followed by an anodizing step for protectively coating the aluminum. It is known that such anodizing results in the formation of non-specular surfaces when aluminum of lower purity grades is used. The process of the invention thus makes it possible to achieve economic savings by the use of less expensive aluminum. Furthermore, it was found that even in the use of high purity aluminum, substantially greater reflectance values are obtained by the described silicate protective coating as compared to the prior aluminum reflectors having an anodized protective film.

Numerous comparative tests have also shown that the silicate film is superior to the anodic oxide protective films heretofore used in terms of resistance to attack by chemical agents of various types, and in the ease of cleaning. The advantages of the reflectors produced by the process of the invention are thus particularly important in such applications as street lighting and industrial luminares which are installed in areas of highly contaminating and corrosive atmospheres. The improved reflectors in such environments not only will retain a high level of light reflection properties for prolonged periods, but are readily cleaned to maintain their original light producing effectiveness.

Tests have also shown that the silicate-coated reflective aluminum of the invention when used as a material for a cooking utensil exhibits non-sticking characteristics similar to a Teflon-coated pan, thus indicating possible applications of the invention also to articles other than optical reflectors. In general, the invention may be found useful in any applications where a highly reflective aluminum article with an easily cleaned transparent protective film is desired.

The process of the invention may be applied to relatively pure aluminum or to alloys thereof, and it will be understood that the term "aluminum" as used in the claims is intended to include relatively pure aluminum as well as alloys of aluminum in which aluminum is the principal metal.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. The method of making a reflective aluminum article which comprises treating the aluminum article to provide a highly specular reflective surface thereon of at least 80% specular reflectance while removing any oxide coating thereon, immediately applying a coating of a silicate solution on the thus treated surface, and heating the thus applied coating at a temperature of at least about 600° F. for removing substantially all the chemically bound water therefrom for producing a hard, tightly adherent, transparent silicate coating on the specular reflective aluminum surface.

2. The method as defined in claim 1, said silicate solution comprising a solution of a silicate selected from the group consisting of potassium silicate and sodium silicate.

3. A method as defined in claim 1, said treating step comprising subjecting the surface of the aluminum article to the action of an acid solution.

4. A method as defined in claim 3, said acid solution comprising a hot solution of a mixture of phosphoric acid and nitric acid in water.

5. A method as defined in claim 2, said silicate solution including a minor amount of a wetting agent.

6. A method as defined in claim 1, said silicate solution comprising, in percent by weight, about 15% combined potassium oxide and silica and about 85% water.

7. A method as defined in claim 6, said silicate solution additionally including about 0.1–0.3% of a compatible wetting agent.

8. A method as defined in claim 4, said silicate solution comprising, in percent by weight, about 15% combined potassium oxide and silica, about 85% water, and about 0.1–0.3% of a compatible wetting agent.

9. A method as defined in claim 1, said heating step being carried out at a temperature of about 600° F. to about 700° F.

10. A method as defined in claim 1, wherein excess silicate coating solution is removed from said aluminum surface and said coating is dried before said heating step.

11. A method as defined in claim 10, said hard silicate coating being treated with an acid solution for neutralizing hydrates in the silicate coating.

References Cited
UNITED STATES PATENTS

| | | | |
|---|---|---|---|
| 1,540,766 | 6/1925 | Daniels et al. | 148—6.27 |
| 1,608,775 | 11/1926 | Daniels et al. | 148—6.27 |
| 2,729,551 | 1/1956 | Cohn | 156—21 |
| 2,978,361 | 4/1961 | Seidl | 117—35 X |
| 2,989,418 | 6/1961 | Harbaugh | 117—135.1 X |
| 3,025,764 | 3/1962 | McKenzie | 117—35 X |
| 3,125,471 | 3/1964 | Conner | 148—31.5 |
| 3,208,874 | 9/1965 | Conner | 117—135.1 |

RALPH S. KENDALL, Primary Examiner

U.S. Cl. X.R.

117—49, 135.1, 169; 148—6.27; 156—21; 350—288